United States Patent
Vitruk et al.

(10) Patent No.: US 7,145,926 B2
(45) Date of Patent: Dec. 5, 2006

(54) RF EXCITED GAS LASER

(76) Inventors: Peter Vitruk, 20029 99th Ct. NE., Bothell, WA (US) 98011; James Schemmer, 4108 San Juan Blvd., Anacortes, WA (US) 98221; Paul Diaz, 15745 NE. 143 Pl., Woodinville, WA (US) 98072

( * ) Notice: Subject to any disclaimer, the term of this patent is extended or adjusted under 35 U.S.C. 154(b) by 248 days.

(21) Appl. No.: 10/762,980

(22) Filed: Jan. 22, 2004

(65) Prior Publication Data

US 2004/0179570 A1 Sep. 16, 2004

Related U.S. Application Data

(60) Provisional application No. 60/442,379, filed on Jan. 24, 2003.

(51) Int. Cl.
*H01S 3/04* (2006.01)
(52) U.S. Cl. .................................. 372/34; 372/55
(58) Field of Classification Search ................. 372/34, 372/55
See application file for complete search history.

(56) References Cited

U.S. PATENT DOCUMENTS

| | | | | |
|---|---|---|---|---|
| 4,534,032 A | * | 8/1985 | Hoag ........................... | 372/34 |
| 4,875,218 A | * | 10/1989 | Hongo et al. .................. | 372/64 |
| 5,894,493 A | * | 4/1999 | Sukhman et al. .............. | 372/83 |
| 5,901,167 A | * | 5/1999 | Sukhman et al. .............. | 372/58 |

* cited by examiner

*Primary Examiner*—Minsun Oh Harvey
*Assistant Examiner*—Tod T. Van Roy

(57) ABSTRACT

RF excited gas laser consists of a laser tube having external surfaces; a power supply compartment having elongated external fins and a pair of endplates on its opposite ends and wherein laser tube is placed between and is flexibly attached to the endplates; a sheet-metal cover mounted to the endplates and to power supply compartment and forming a laser assembly and having at least one pair of intake openings and at least one pair of exhaust openings for the cooling air to flow through the laser assembly by entering the laser assembly through the intake openings and flowing over power supply external fins and over laser tube external surfaces and then exiting through the exhaust openings. Present invention is characterized by lower cost and more efficient forced air cooling laser tube and RF power supply.

8 Claims, 6 Drawing Sheets

RF EXCITED GAS LASER

REFERENCE TO PROVISIONAL APPLICATION

This application claims the benefit of the U.S. Provisional Application No. 60/442,379 filed Jan. 24, 2003.

TECHNICAL FIELD

This invention relates to radio-frequency (RF) excited gas lasers, especially to air-cooled low and medium power $CO_2$ lasers.

BACKGROUND OF INVENTION

Prior art RF excited gas laser design pioneered by Katherine D. Laakmann (U.S. Pat. No. 4,169,251) defines an elongated laser resonator chamber being excited by transversely applied radio frequency (RF) field.

This basic design of RF excited laser has been further improved by Peter Laakmann (U.S. Pat. No. 4,805,182) through all-metal laser tube arrangement having metal electrodes and metal side-walls forming an elongated laser resonator chamber with electrodes and side-walls being diffusion-cooled by closely spaced walls of the metal tube envelope. Square shaped elongated laser tube is placed inside of the laser housing assembly in such a way that only two (opposite) sides of the tube could be cooled by the heat-sinking walls of the laser housing. These heat-sinks, i.e. the walls of the housing, are cooled by forced air flow or by liquid coolant. At least one side surface of the laser tube faces the heat dissipating power supply electronics compartment, which limits cooling efficiency of the laser tube and is a disadvantage of this design. In order to prevent laser tube from thermal distortions, it needs to be thermally isolated from electronics compartment, which further complicates laser design.

The art of the forced air cooled RF excited gas lasers is further advanced by Yefim Sukhman et. al. (U.S. Pat. Nos. 5,754,575 and 5,894,493) through flexible tube-to-heatsink interface minimizing laser tube deformations induced by the heat-sinks. A disadvantage of all prior art designs is in the complexity of the flexible tube-to-heat interface assemblies. Another disadvantage of this design is in relative inefficiency of the laser tube cooling because of the close proximity of heat dissipating power supply compartment. Furthermore, only 50% of the laser tube surface can be cooled, which also contributes to low cooling efficiency of this design. Another disadvantage of this design is in relatively inefficient cooling of the power supply electronics, which is mounted onto the heat spreader in close proximity of the heat dissipating laser tube.

Forced air cooling concept in RF excited gas lasers was modified by Yefim Sukhman et. al. (U.S. Pat. No. 5,901,167) through defining separate air flow passages for laser tube and for power supply housing. A disadvantage of this design is in high air flow resistance resulted from the complexity of the air duct geometry. Increased air flow resistance results in reduced air flow if inexpensive and convenient axial fans are used. Reduced air flow limits cooling efficiency. An additional disadvantage of this and other prior art designs described above is in the relative complexity and cost of the laser housing.

It is an object of the present invention to reduce the cost and to simplify the forced air cooling design in gas lasers with RF excitation. It is a further object of the current invention to improve and simplify the cooling of laser tube internal electrode structure.

SUMMARY OF INVENTION

RF excited gas laser according to present invention consists of an elongated electronics compartment having elongated external fins; an RF power supply placed inside electronics compartment; a pair of endplates attached to the opposite ends of the electronics compartment; a sealed laser tube comprising a metal tube having an external surface, a pair of endcaps at the opposite ends of the metal tube forming a vacuum envelope for containing a laser gas, a pair of elongated electrodes inside the metal tube configured for coupling to said RF power supply through RF coupling means; laser resonator mirrors placed on the endcaps at the opposite ends of the tube forming a laser resonator aligned with the RF gas plasma discharge produced between said electrodes; a sheet-metal cover enclosing the laser tube and the electronics compartment forming a laser assembly having at least one pair of intake openings and at least one pair of exhaust openings for the cooling air to flow through the laser assembly; and at least one pair of fans placed at the intake openings of the laser assembly, wherein laser tube is placed inside the laser assembly and is flexibly attached to the endplates, cooling air enters the laser assembly through the intake openings and flows through the laser assembly over the external surface of the tube and over the external fins of the electronics compartment and then exits through the exhaust openings. Present invention is characterized by lower cost and simpler laser tube and laser assembly design as well as more efficient forced air cooling of heat dissipating laser tube and RF power supply.

DETAILED DESCRIPTION OF THE INVENTION

Figure 1:
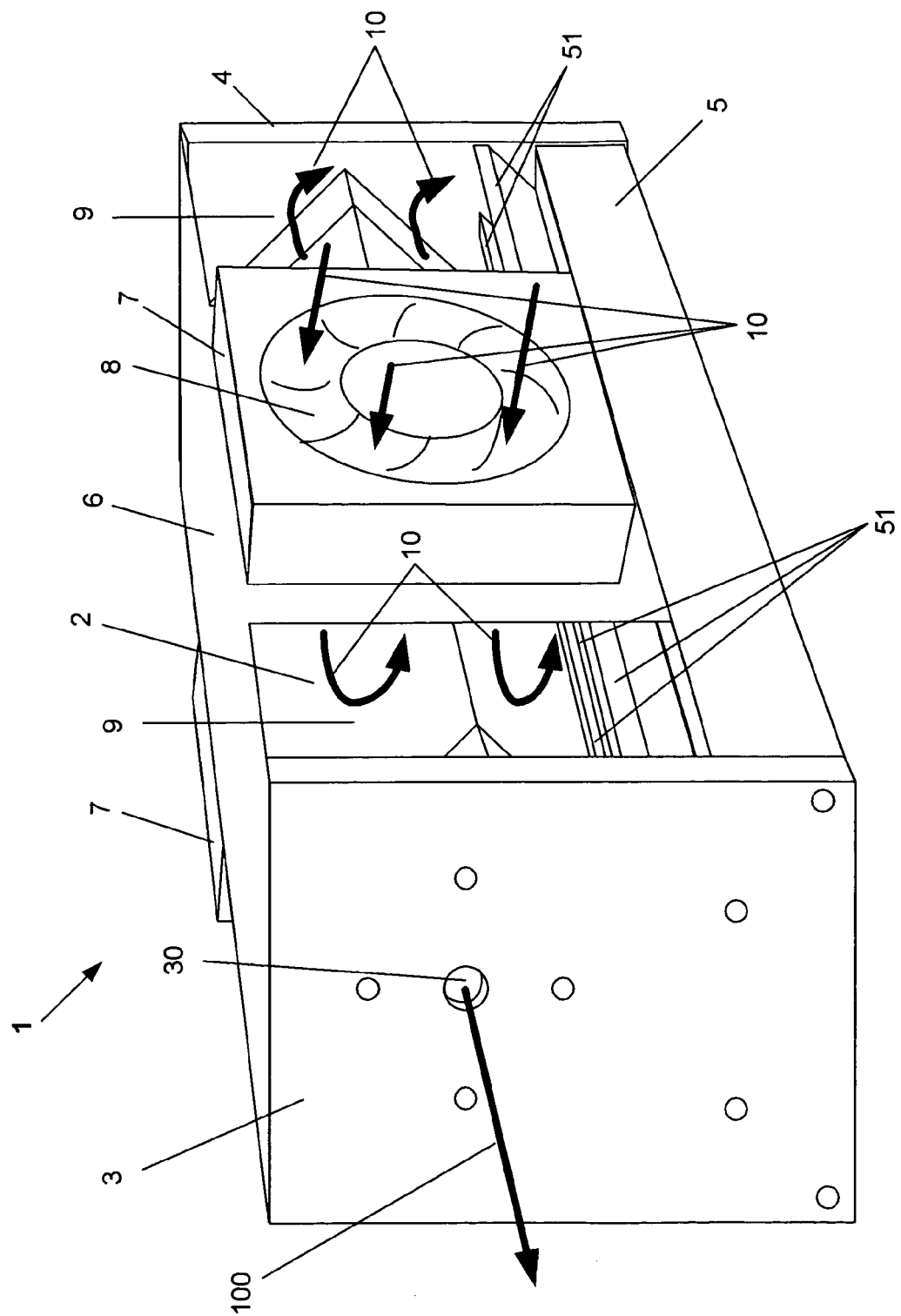
FIG. 1 is an isometric schematic diagram of RF excited gas laser assembly.

FIG. 1 is an isometric schematic diagram of RF excited gas laser assembly 1 according to present invention, consisting of laser tube 2 supported by and between front endplate 3 rear endplate 4. Endplates 3 and 4 are mounted on the electronics compartment 5. Sheet metal cover 6 with fans 7 on it is mounted to the endplates 3 and 4 and to the electronics compartment 5 to form air intake openings 8 under the fans 7 and air exhaust openings 9. The cooling air flow 10 enters the laser assembly 1 through the fans 7 and air intakes 8. The cooling air flows over the external surface of the laser tube 2 and over the fins 51 extending off the electronics compartment 5, thus providing an efficient cooling for both the laser tube 2 and electronics compartment 5. The external surface of the laser tube 2 is cooled exclusively by the flow 10 of the cooling air and not by any additional prior-art heat-sinks being in mechanical contact with the external surface of the tube 2. Laser beam 100 exits the laser through the laser beam opening 30 in endplate 3.

Unlike in all prior art RF excited gas laser designs, the present invention allows for air flow 10 to uniformly cool all four side surfaces of rectangular (or square) shaped laser tube 2. Because all sides of the laser tube 2 are exposed to air flow 10, there is no need for using prior-art finned heat-sinks attached to the laser tube to achieve the same, or comparable, efficiency of the forced air cooling as in prior art air cooled laser designs. Additionally, unlike prior art designs, present invention allows for far more efficient flow of cooling air 10 over the fins 51 of the electronics compartment 5, as explained in more detail in FIGS. 2 and 3.

Figure 2:
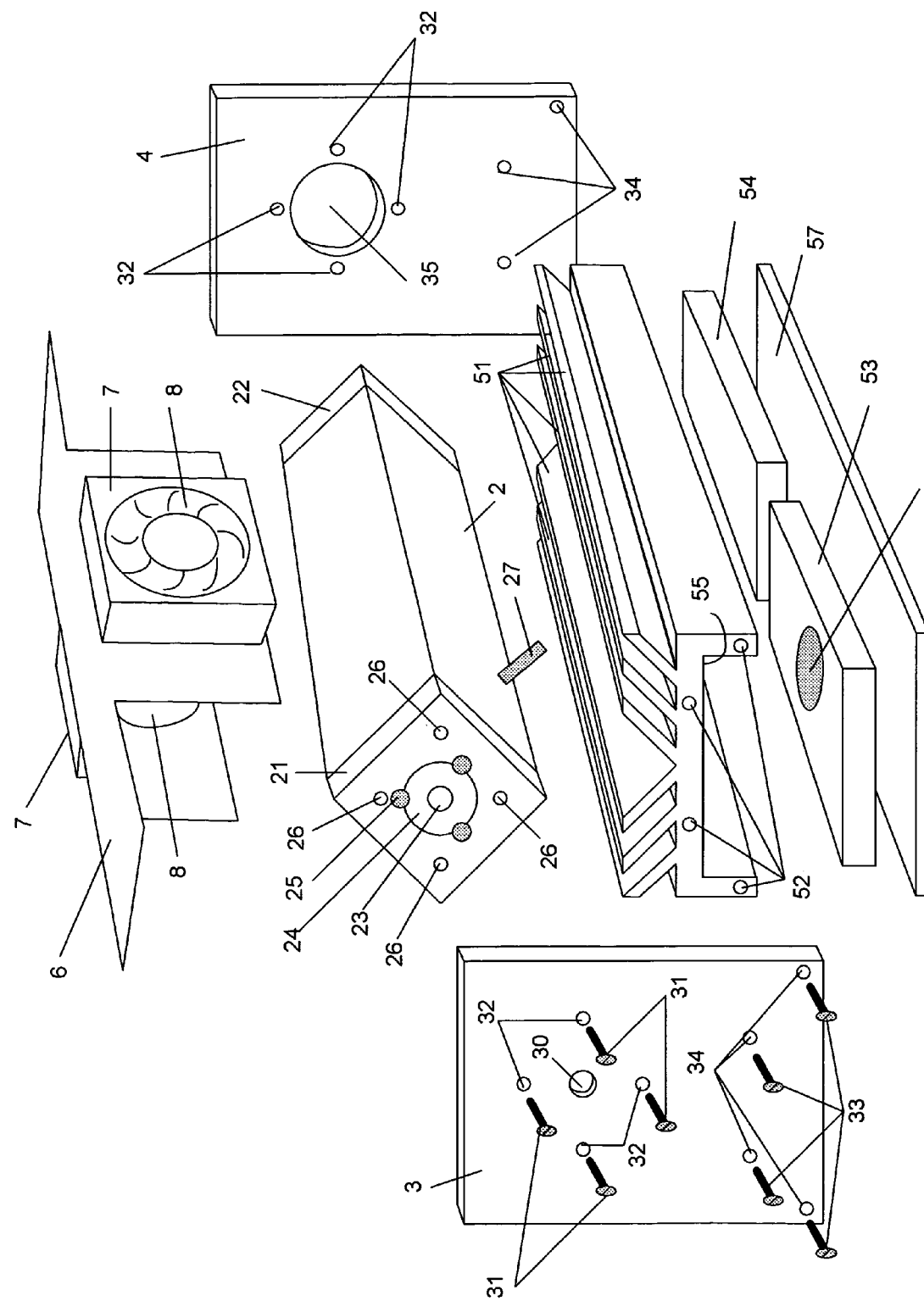
FIG. 2 is an isometric schematic diagram showing main components of RF excited gas laser.

FIG. 2 is an isometric schematic diagram showing main components of air-cooled RF excited gas laser. Laser tube 2 has two endcaps 21 and 22, which are welded to the tube forming a vacuum sealed envelope containing laser gas as well as RF electrodes and other laser tube components. Laser resonator mirrors 23 are located on the endcaps 21 and 22 on the opposite ends of laser tube 2. Laser mirror 23 is held in mirror holder 24, which is fastened to the endcap by means of screws 25, which are mirror alignment screws. Also located on the endcaps 21 and 22 are threaded blind holes 26 used for mounting the laser tube 2 to the endplates 3 and 4 by means of screws 31 placed inside of through holes 32 on the endplates 3 and 4. Another set of screws 33, located inside through holes 34 and corresponding threaded blind holes 52 on the electronics compartment, is used to fasten the endplates 3 and 4 to the electronics compartment 5. Pocket 35 on the endplates 3 and 4 is made to eliminate mechanical interference of laser mirror holders 24 with the endplates 3 and 4.

Electronics compartment 5 contains RF power supply board 53 and control circuitry board 54, both mounted onto the surface 55 of the electronics compartment 5 and located closest to the fins 51. Such placement of the RF power supply allows for the most efficient cooling of the RF power transistor(s) 56, which are the most heat dissipating active electronics components in any design of RF excited gas laser. Bottom cover 57 provides EMI and RFI sealing by fastening it to both endplates 3 and 4 as well as to the electronics compartment 5. RF power supply 53 is connected to the laser tube 2 and its internal electrodes by means of RF connector 27, which essentially is a vacuum sealed electrical feedthrough. RF connector 27 is placed inside of EMI block 58 as further detailed in FIG. 3.

Figure 3:
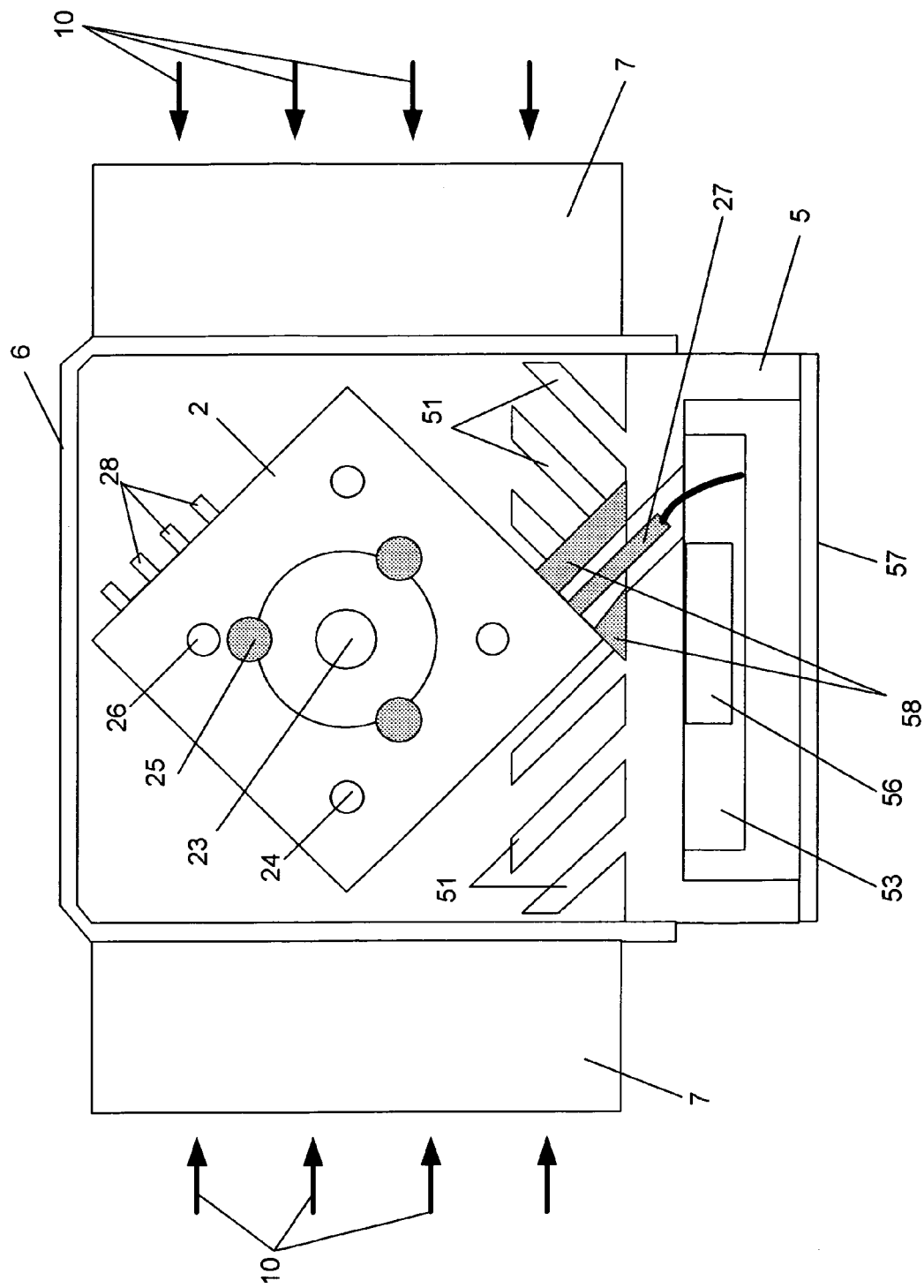
FIG. 3 is a transverse cross-sectional schematic diagram of RF excited gas laser.

FIG. 3 is a transverse cross-sectional schematic diagram of RF excited gas laser. EMI block 58 is placed in a cut-out on the finned surface side of the electronics compartment 5. EMI block 58 is electrically insulated from RF connector 27 and is shaped to form a tight electrical contact both with the laser tube 2 and electronics compartment 5. As evident from FIG. 3, air flow 10 entering laser assembly 1, immediately is directed at full speed at all four surfaces of the laser tube 2 as well as at all fins 51 on electronics compartment 5. As the air flow redirects toward air exhausts 8 (see FIG. 1), it cools surfaces of the laser tube 2 and fins 51 away from the fans 7. For long laser assemblies, multiple fans 7 and multiple air exhausts 8 (see FIG. 1) can be used to increase cooling capacity of this design. Also, laser tube could be extruded with elongated axial fins 28 on its external surface, as shown on FIG. 3, to further increase cooling efficiency of this design. As also evident from FIG. 3, laser tube 2 and electronics compartment 5 generally have different temperatures because of the generally different heat dissipation rates by the tube 2 and RF transistor(s) 56. Dissimilar heat dissipation rates require such design features as to eliminate unwanted thermal deformations of the laser tube, such as bending and warping. This is achieved in present invention by mechanically and thermally isolating laser tube 2 from electronics compartment 5 as detailed in FIGS. 4a and 4b.

Figure 4A:
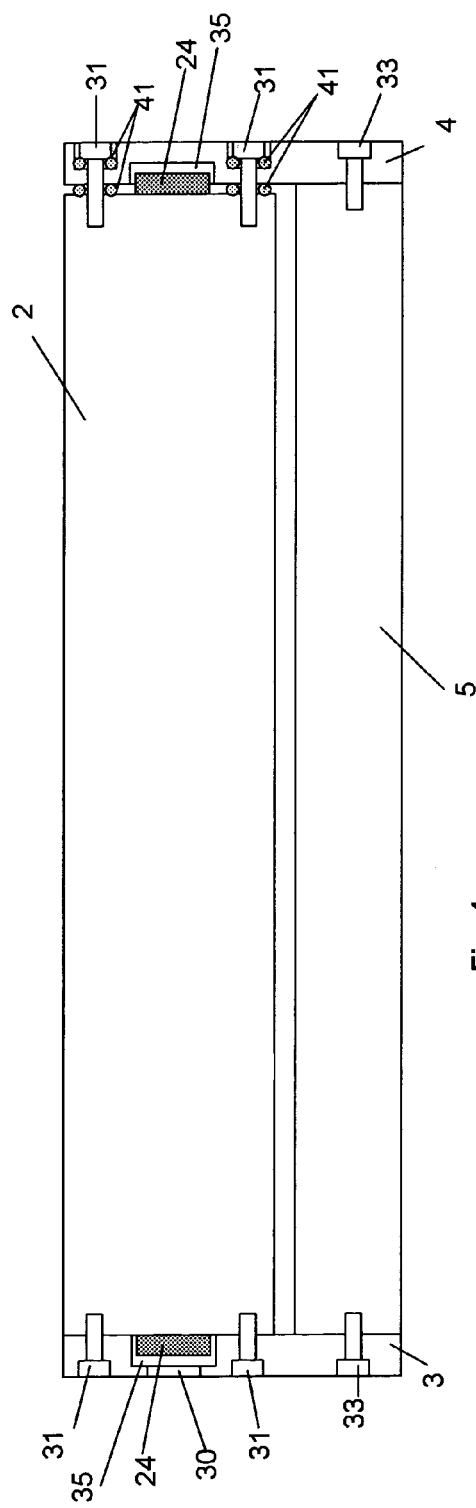
FIG. 4 is an axial cross-sectional schematic diagram of RF excited gas laser.
Figure 4B:
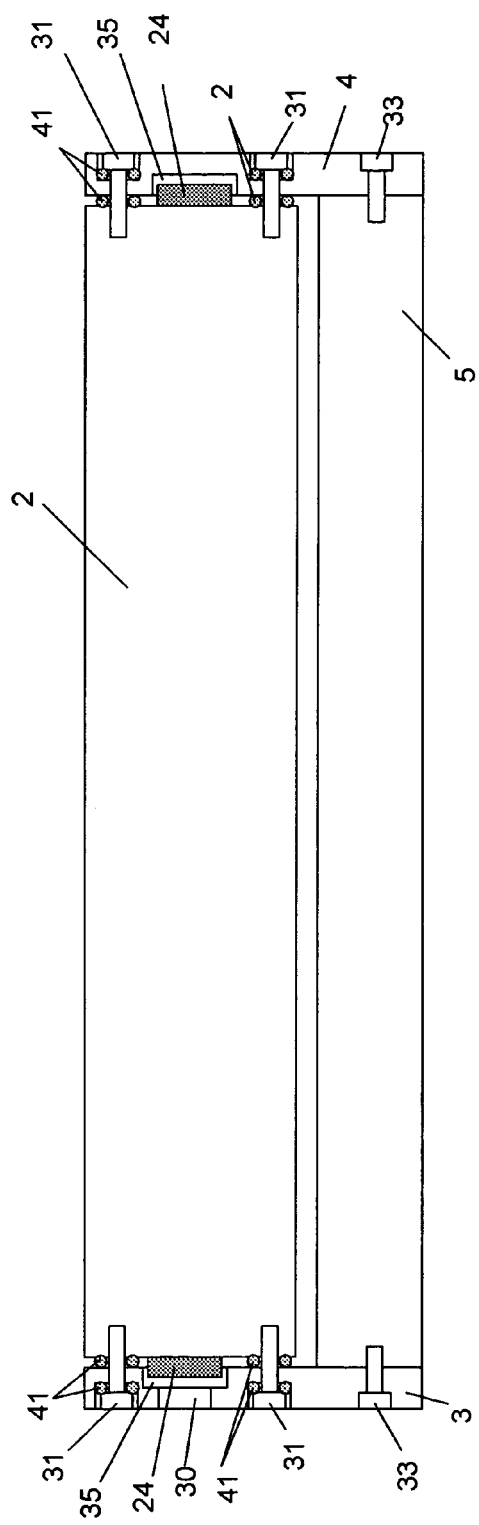

FIGS. 4a and 4b are axial cross-sectional schematic diagrams of RF excited gas laser indicating flexible mounting means used either on rear endplate 4 or on both endplates 3 and 4. Flexible means are the compressible washers 41, e.g. spring washers or rubber O-ring gaskets, used between the laser tube and the endplate(s) as well as between the heads of the screws 31 and the endplate(s). Flexible mounting of the tube 2 to the endplates 3 and 4 allows for linear thermal expansion of both the laser tube 2 and electronic compartment 5 without tube bending or warping. Endplates 3 and 4 are mounted to the electronic compartment 5 in such a way that eliminates any movement of endplates 3 and 4 relative to each other and relative to electronic compartment 5. This defines a rigid and stable optical frame to which external laser system components, like focusing lenses or moving mirrors, etc. Laser tube resonator formed by the tube 2 and laser mirrors 23 on it are independent from thermal or mechanical distortions of the endplates 3 and 4, electronic compartment 5 and sheet-metal cover 6. Unlike many other prior art air-cooled RF excited gas laser designs, current invention allows for greater optical and mechanical stability of the laser tube 2 regardless of the environment it operates in. Internal design of the laser tube 2 further facilitates optical stability of the laser tube resonator through uniform heat dissipation through the surfaces of the laser tube 2, as further explained in FIGS. 5 and 6.

Figure 5:
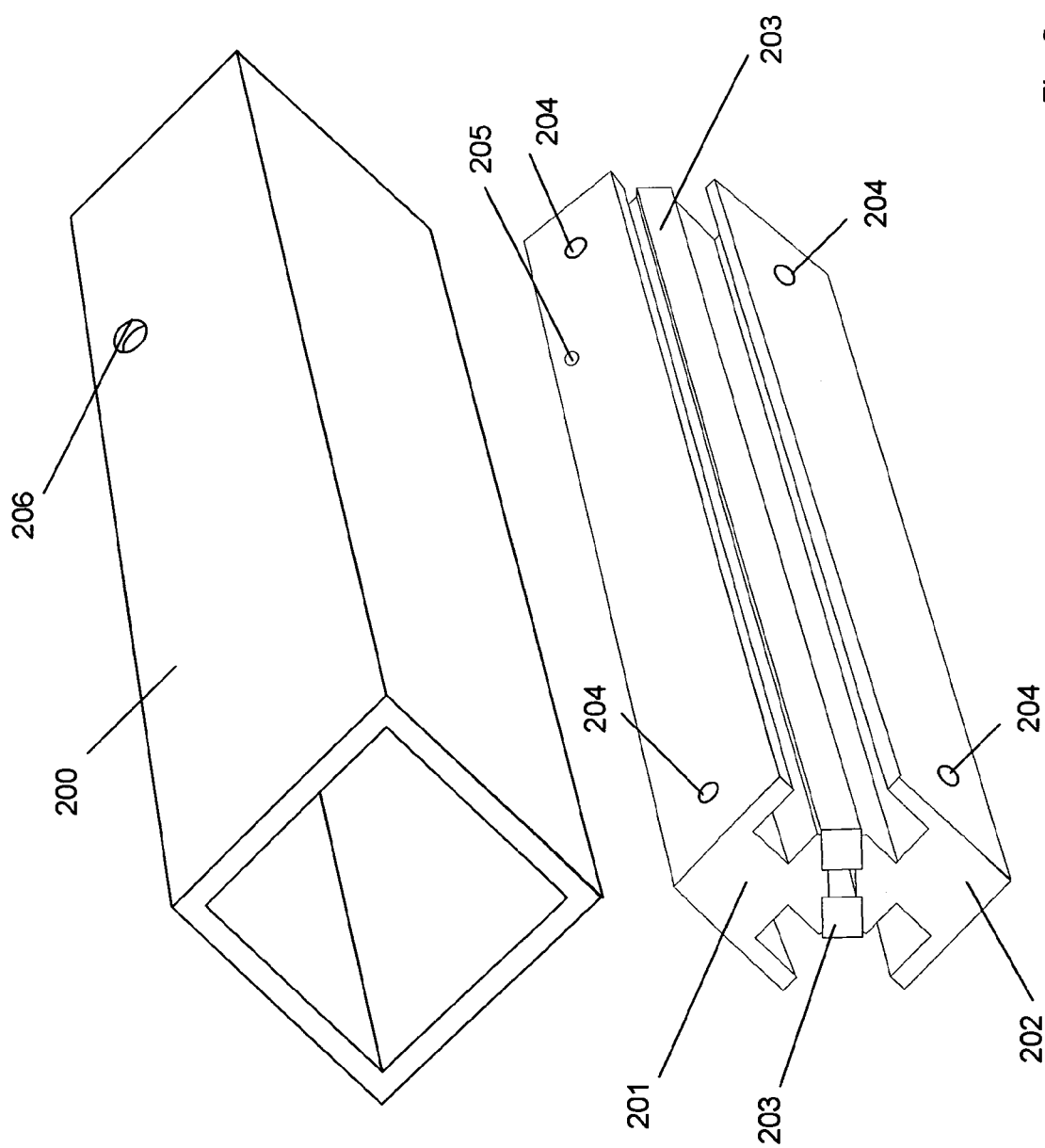
FIG. 5 is an isometric schematic diagram of laser tube's main components.

FIG. 5 is an isometric schematic diagram of laser tube's main components, such as metal tube 200, electrodes 201 and 202, two ceramic bars 203 and plurality of ceramic spacers 204. Electrode 201 has a threaded hole 205 (aligned against through hole 206 on the metal tube 200) designated for RF connector 27 (see FIG. 2). Electrodes, ceramic bars and spacers are shown in FIG. 5 in pre-assembled configuration ready to be installed inside the metal tube 200.

Figure 6:
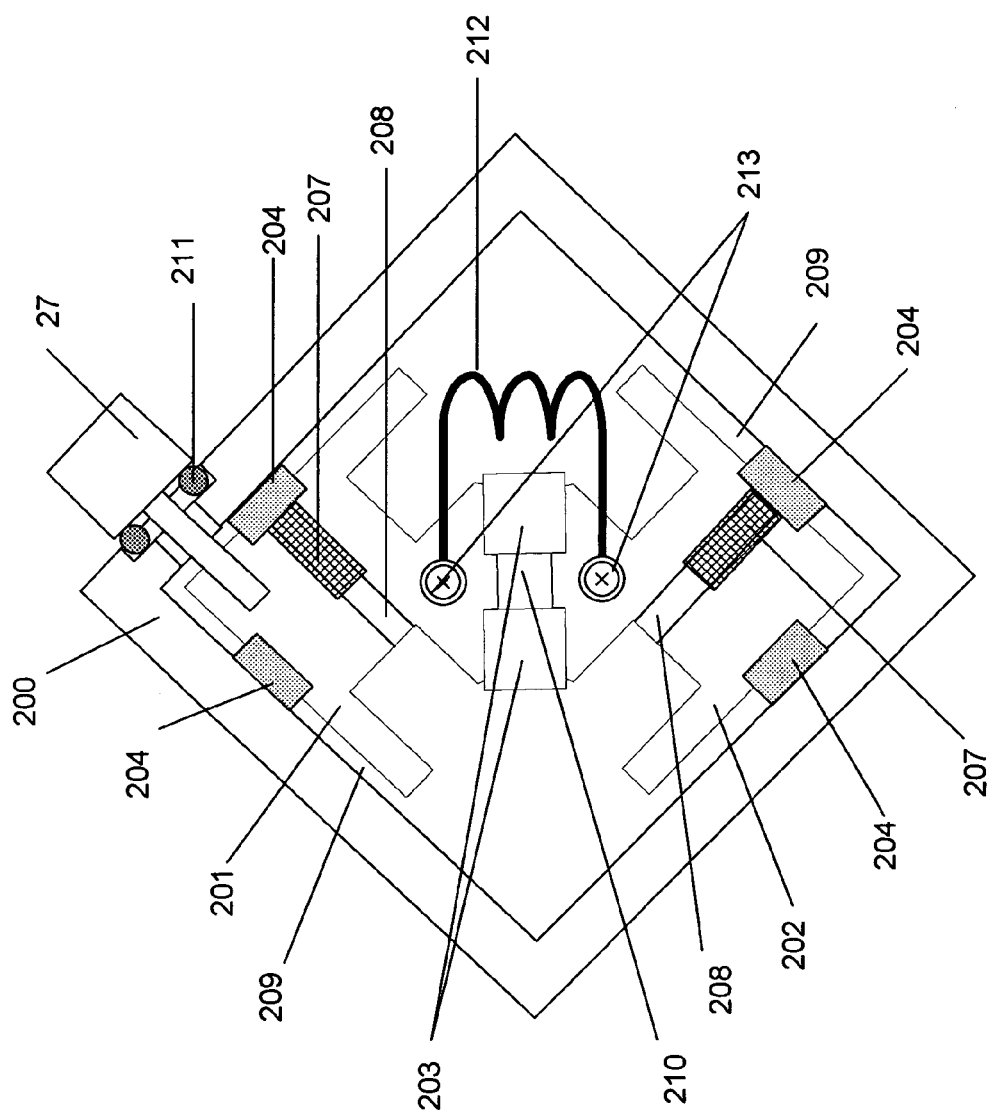
FIG. 6 is a transverse cross-sectional schematic diagram of assembled laser tube.

FIG. 6 is a transverse cross-sectional schematic diagram of assembled laser tube. Electrodes 201 and 202 together with ceramic bars 203 are compressed by tightening set-screws 207 so that some of the ceramic spacers 204 are expanded against the walls of the metal tube 200. Set screws 207 are guided by the threaded holes 208. Electrode-to-tube gap 209 is set to be fairly small, in the range of 0.010" to 0.030", in order to provide efficient heat transfer from electrodes 201 and 202 into the walls of the metal tube 200. Electrodes 201 and 202 together with ceramic bars 203 also define laser bore channel 210 filled with gas discharge plasma when RF power is coupled from RF power supply board 53 to electrode 201 by means of RF connector 27. Rubber O-ring 211 serves as an electrical insulator to de-couple RF connector 27 from metal tube 200. Additionally, O-ring 211 provides vacuum seal at the location of RF connector 27. Small electrode-to-tube gap 209 also serves as an electrical capacitance C, essential to establish resonant tank circuit inside of the laser tube. Resonant coil inductor 212 is connected between electrodes 210 and 202 by means of screws 213. Inductance L of coil inductor 212 is chosen to resonate with electrode-to-tube capacitance C at the frequency close to operating frequency of RF power supply board 53; under these resonant conditions RF power could only be connected to one electrode 201, while electrode 202 is driven through the resonant coil 213 in anti-phase with electrode 201. Symmetrical design and location of electrodes 201 and 202 allows for uniform and symmetrical heat transfer from plasma in bore 210 to the walls of the metal tube 200. Symmetrical heat dissipation by tube 200 together with symmetrical and uniform cooling of the tube by air flow 10 prevents laser tube 2 from bending and facilitates optical and mechanical stability of laser tube 2.

Preferred embodiment of the present invention is a low power RF excited $CO_2$ gas laser shown in FIGS. 1 and 2. Laser length is approximately 15", its width is 3" and height is 4". 150 Watt RF power supply board 53 is driven by low voltage DC power supply (external). Laser is capable of delivering between 15 to 20 Watts of laser power in continuous mode; laser is cooled by two to four 3" square fans, one or two on each side of the laser. Laser can be operated at typical ambient temperatures (5°–40°) for thousands of hours without deteriorating of output laser beam quality or laser power and without overheating of laser tube 2 or electronics compartment 5.

It should be understood that even though numerous features and advantages of the present invention have been set forth, the above disclosure is illustrative only. For example, a variety of external shapes of the laser tube can be used as well as different geometries of the fins on electronics compartment to achieve the performance and cost parameters of the design according to present invention. Changes may be made in detail and yet remain within the broad principles of the present invention. Accordingly, the invention is not limited except as by the following claims.

The invention claimed is:

1. RF excited gas laser comprising:
   an elongated electronics compartment having elongated external fins; and
   an RF power supply placed inside electronics compartment; and
   a pair of endplates attached to the opposite ends of the electronics compartment; and
   a sealed laser tube comprising of a metal tube having an external surface, a pair of endcaps at the opposite ends of the metal tube forming a vacuum envelope for containing a laser gas and at least one pair of elongated electrodes inside of the metal tube configured for coupling to said RF power supply through RF coupling means; and
   a pair of laser resonator mirrors placed on the endcaps at the opposite ends of the tube forming a laser resonator aligned with the RF gas plasma discharge produced between said electrodes; and
   a cover enclosing the laser tube and the electronics compartment forming a laser assembly having at least one intake opening and at least one exhaust opening for the cooling air to flow through the laser assembly; and
   at least one fan placed at the intake opening of the laser assembly; and
   wherein said laser tube is placed inside the laser assembly and is flexibly attached to the endplates allowing for cooling air flow to enter the laser assembly through the intake opening and to flow through the laser assembly over the external surface of the tube and over the external fins of the electronic compartment and then exit the laser assembly through the exhaust opening; and
   wherein said external surface of the laser tube is not in mechanical contact with any additional heat-sinks.

2. The laser of claim 1 wherein said RF coupling means comprise vacuum sealed RF electrical feedthrough connected to at least one electrode and coupled to said RF power supply.

3. The laser of claim 1 wherein said laser tube having square cross-section.

4. The laser of claim 1 wherein said external surface of the laser tube comprises elongated fins to facilitate heat transfer from the tube to the flowing air.

5. The laser of claim 1 wherein said electrodes inside laser tube are closely spaced to the walls of the tube to facilitate heat transfer from electrodes to the tube.

6. The laser of claim 5 wherein said electrodes inside laser tube are centered against the opposite corners of the laser tube.

7. The laser of claim 1 wherein multiple pairs of electrodes are placed inside laser tube to define a longer laser resonator consisting of multiple discharge sections.

8. The laser of claim 1 wherein said laser gas includes $CO_2$, $N_2$ and He.

* * * * *